Patented Mar. 27, 1923.

1,449,826

UNITED STATES PATENT OFFICE.

HIRAM Y. McBRIDE, OF DENVER, COLORADO, ASSIGNOR TO THE UNITED STATES WOOL COMPANY, OF DENVER, COLORADO, A CORPORATION OF ARIZONA.

WOOL PRODUCT.

No Drawing. Original application filed April 23, 1920, Serial No. 376,130. Divided and this application filed October 2, 1922. Serial No. 591,941.

*To all whom it may concern:*

Be it known that I, HIRAM Y. MCBRIDE, a citizen of the United States, residing at Denver, in the county of Denver and State of Colorado, have invented a new, useful, and Improved Wool Product, of which the following is a specification.

The subject matter of this application is a part of my application for wool cleaning, original application filed April 23, 1920, Serial Number 376,130, allowed June 1, 1920. Renewal application filed May 29, 1922, Serial Number 564,620, allowed June 28, 1922.

This product is the result of a method of cleaning raw or greasy wool wherein such wool is agitated for a time with dead burnt gypsum—that is, gypsum or plaster of Paris which has been roasted at a sufficient temperature and for a sufficient time to lose substantially entirely its power for combining with water.

In the preparation of wool for use in the industries, it is a necessary preliminary step to free the raw wool of the natural grease, suint, or yolk which it contains; a more or less indefinite material containing various water soluble potassium salts, greases and various other organic matters. The wool must also be freed of various other extraneous materials, dirt, etc. Upon the completeness of the removal of these natural impurities depends much of the success of subsequent operations in fabric making. The foreign matters in the wool are, more or less, like a varnish over the surface and this varnish must be removed.

The wool fiber has a more or less rough or "serrated" surface, sometimes referred to as scales, and it is particularly difficult to remove all traces of the foreign matter occurring in the serrations of the fiber. One type of method used for cleaning raw wool is to agitate it with various dry powders. The dirt, wool grease etc. are taken up by these powders and may be removed with them. While many such powders may be used and certain have been proposed, they do not by any means act alike and it is difficult to secure one which will produce the desired type of thorough-going purification; to secure a material which will effectually remove all the extraneous matter from the wool fibers and which can itself be entirely removed with facility.

One of the best of these pulverulent materials is gypsum, or plaster of Paris, in its various forms. Gypsum, chemically considered, is $CaSO_4.2H_2O$; that is, it is calcium sulphate with two molecules of water of crystallization. By carefully roasting or baking, or as it is frequently termed "calcining," it is converted into ordinary plaster of Paris with the loss of most of its water of crystallization. In the conditions in which it is left by this baking or calcining operation, it is able to take up the lost water and reform the original crystallized material; this being the reason that it "sets" with water.

I have found that dead burnt gypsum in contact with greasy wool removes the dirt much more thoroughly than other varieties of gypsum materials. And I find that not only does it take off the grease, etc. from the surface of the fiber but it also removes the grease from the serrations; producing a wool which spins, felts and weaves with unusual facility and which takes dyes and colors much more readily and sharply than otherwise purified wool. As for the reason for the observed superiority of dead burnt gypsum over ordinary gypsum material, I am not certain and content myself with noting the observed fact without committing myself to any theory as to the reasons therefor. I may note however that, whatever the reasons may be, wool cleaning by pulverulent materials is a matter involving, at least to some extent, adsorption phenomena, and adsorption of greasy matters by surfaces which do not contain, and will not take up water, is better than it ever is with moist or hydrated surfaces. But whatever the reason, the fact is as stated; that gypsum deprived of the power of combining with water by dead burning removes grease etc. much more effectually than other gypseous materials, even where such material is baked to a substantially anhydrous condition by a baking for a shorter time and at a lower temperature.

One incidental advantage of using dead burnt gypsum for the present purposes which I have noted is that such gypsum does not tend to clump up, since such moisture as is in the wool does not affect it.

In preparing gypsum for my purposes, any ordinary gypseous material of good quality, such as native gypsum, land plaster, plaster of Paris, etc., may be employed. Calcination of such gypsum at a temperature of 500° C. for two hours gives a material suitable for my purposes. I have found it advantageous, in most instances, to calcine the gypsum at about 700° C. for a period of about forty eight hours—gypsum so calcined has given satisfactory results. Any ordinary type of calcining apparatus adapted for economical treatment of the material at a high temperature may be used. Calcination should be carried on for a sufficient time and at a sufficient temperature to cause the material to lose its power of setting with water; and should be controlled by tests from time to time. The material is best reduced to a powder of at least 250 mesh prior to use.

The powder may be distributed through the wool by any suitable form of agitating device. With a good quality of dead burnt gypsum, it will be found that after the agitation is complete, the gypsum, together with the matters taken up, may be readily removed by any suitable dusting device of standard type, leaving no residue of either gypsum or grease on the wool. The wool is clean and ready for manufacturing etc. In contacting the wool and dead burnt gypsum, this is best done if the wool is warmed, say, between 100° and 140° F., as this facilitates the action of the dead burnt gypsum in taking up grease, etc.

In practical embodiments of my invention it is advantageous to pick the wool preliminarily in any of the usual devices, adding a little dead burnt gypsum to it during the picking. The picked wool, together with the gypsum, may then be passed through a warm chamber, say, at 100° or 140° F. by means of an imperforate belt. More dead burnt gypsum may be added during this time. Finally the wool may be delivered to a perforate belt in the same chamber. Most of the gypsum and the matter taken up thereby is dropped through the perforations at the bottom of the chamber whence it may be removed by a conveyer or other suitable device. Finally the wool may be freed from the rest of the gypsum, etc., in any ordinary dusting or beating device.

In the commercial process of scouring wool, either by the wet method with water or by a chemical solvent, the resulting product is irregularly stained due to the difficulty of removing all the grease in the wool. It is therefore not the natural color of the wool. It is also more or less felted or matted and requires to be opened up before it can be used in the textile arts.

In my improved cleansed product, after the treatment of the wool in the grease, the raw wool is open and lofty, and of the natural color of the wool. My product is in marked contrast, in its physical characteristics, to the scoured, felted or matted, irregularly stained commercial degreased raw wool.

In the production of my new product I treat the wool in the grease by opening up or lofting the wool fibers by moving them in substantially the same direction, and by applying a grease absorbent to the wool fibers while in said open and lofty condition during said direction of movement. The fibers of the wool thus treated are freed of grease stains and are made open and lofty by a treatment which separates the wool fibers and keeps them free.

This new product has a greater affinity for dye than wet scoured wool because of the fact that the fibers are evenly degreased. It is therefore in a better condition for dyeing.

In my product the scales or serrations of the wool fibers are left in their natural state. In commercially degreased wool the scales or serrations of the fibers are distorted and injured by being unduly opened or bent over, or weakened or broken, and thereby its desired qualities greatly impaired. These defects are inherent in wool produced by other processes.

The new product is open and lofty, and as such the fibers of the wool are lustrous because their scales or serrations are left in their natural state with the color unimpaired. By my cleansing process, as distinguished from scouring by the wet process or by dry processes, the scales or serrations of the fibers are cleansed and left in their natural state, and are not injured or distorted.

I would define the process for obtaining my improved product as a process of treating wool by opening or lofting its fibers and moving them in substantially the same direction, and, during said direction of movement, applying to the open and lofty wool a grease absorbent for freeing the product from grease stain and preserving the scales or serrations of its fibers unimpaired.

The grease absorbent used is dead burnt gypsum. In fact it may be said that my improved product is wholly dependent upon the use of finely powdered dead burnt gypsum, whether ordinary or dehydrated gypsum. The use of ordinary or dehydrated gypsum, or plaster of Paris, does not produce my product. The presence in my product of any particles of ordinary powdered gypsum would defeat the product, because such gypsum when exposed to moisture, whether in the gypsum, atmosphere, or wool, "sets" or hardens. Dead burnt gypsum does not set or clump up.

What I claim is:—

1. A cleansed, open, lofty degreased wool product substantially as set forth.

2. A cleansed, open, lofty, lustrous, raw wool product of the natural color of the wool, the scales or serrations of the fiber of which are in the natural state.

HIRAM Y. McBRIDE.